US012658959B2

(12) United States Patent
Huang et al.

(10) Patent No.: US 12,658,959 B2
(45) Date of Patent: Jun. 16, 2026

(54) SIM CARD COMMUNICATION CIRCUIT, RELATED APPARATUS, AND CONTROL METHOD

(71) Applicant: Honor Device Co., Ltd., Shenzhen (CN)

(72) Inventors: Ting Huang, Shenzhen (CN); Fei Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 427 days.

(21) Appl. No.: 18/558,104

(22) PCT Filed: Jan. 31, 2023

(86) PCT No.: PCT/CN2023/073925
§ 371 (c)(1),
(2) Date: Oct. 30, 2023

(87) PCT Pub. No.: WO2024/036887
PCT Pub. Date: Feb. 22, 2024

(65) Prior Publication Data
US 2025/0080150 A1     Mar. 6, 2025

(30) Foreign Application Priority Data

Aug. 15, 2022    (CN) .......................... 202210971419.6

(51) Int. Cl.
*H04Q 7/20* (2006.01)
*H04B 1/3818* (2015.01)
(52) U.S. Cl.
CPC ................................. *H04B 1/3818* (2015.01)

(58) Field of Classification Search
CPC ............................... H04B 1/3818; H04B 1/40
See application file for complete search history.

(56) References Cited

U.S. PATENT DOCUMENTS

| | | | |
|---|---|---|---|
| 11,558,734 B2 * | 1/2023 | Crespo | ................... H04W 8/18 |
| 2019/0246266 A1 | 8/2019 | Wane | |
| 2021/0250430 A1 | 8/2021 | Moon | |

(Continued)

FOREIGN PATENT DOCUMENTS

| | | |
|---|---|---|
| CN | 106507338 A | 3/2017 |
| CN | 209280790 U | 8/2019 |

(Continued)

*Primary Examiner* — Tuan Pham
(74) *Attorney, Agent, or Firm* — Conley Rose, P.C.

(57) ABSTRACT

A SIM card communication circuit. The circuit includes a processor, a first level conversion apparatus, a first card slot, and an ESIM chip; both an input port of the first level conversion apparatus and the ESIM chip are connected to the processor, and an output port of the first level conversion apparatus is connected to the first card slot; and the processor is configured to: when receiving a first message, control the first level conversion apparatus to be enabled, and control the ESIM chip to be disabled, to implement a connection between the processor and a first physical SIM card in the first card slot; or the processor is configured to: when receiving a second message, control the first level conversion apparatus to be disabled, and control the ESIM chip to be enabled, to implement a connection between the processor and an ESIM card in the ESIM chip.

20 Claims, 4 Drawing Sheets

(56) References Cited

U.S. PATENT DOCUMENTS

| | | | | |
|---|---|---|---|---|
| 2022/0330007 | A1* | 10/2022 | Li | ......................... H04W 8/183 |
| 2023/0308861 | A1* | 9/2023 | Fan | ....................... H04W 12/45 |

FOREIGN PATENT DOCUMENTS

| | | | |
|---|---|---|---|
| CN | 209805804 | U | 12/2019 |
| CN | 111741543 | A | 10/2020 |
| CN | 112232096 | A | 1/2021 |
| CN | 113676970 | A | 11/2021 |
| CN | 113836951 | A | 12/2021 |
| CN | 215493959 | U | 1/2022 |
| CN | 215897719 | U | 2/2022 |
| CN | 114884528 | A | 8/2022 |
| CN | 114885322 | A | 8/2022 |
| CN | 115052063 | A | 9/2022 |
| EP | 4109967 | A1 | 12/2022 |
| WO | 2021185105 | A1 | 9/2021 |

* cited by examiner

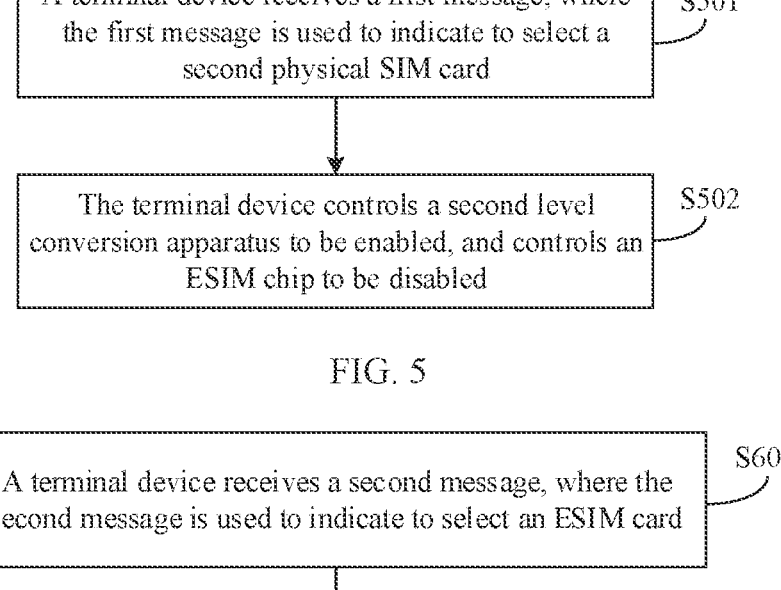

A terminal device receives a first message, where the first message is used to indicate to select a second physical SIM card          S501

The terminal device controls a second level conversion apparatus to be enabled, and controls an ESIM chip to be disabled          S502

FIG. 5

A terminal device receives a second message, where the second message is used to indicate to select an ESIM card          S601

The terminal device controls a second level conversion apparatus to be disabled, and controls an ESIM chip to be enabled          S602

FIG. 6

SIM CARD COMMUNICATION CIRCUIT, RELATED APPARATUS, AND CONTROL METHOD

CROSS-REFERENCE TO RELATED APPLICATIONS

This is a U.S. National Stage of International Application No. PCT/CN2023/073925 filed on Jan. 31, 2022, which claims priority to Chinese Patent Application No. 202210971419.6, filed with the China National Intellectual Property Administration on Aug. 15, 2022, both of which are incorporated herein by reference in their entireties.

TECHNICAL FIELD

This application relates to the field of terminal technologies, and in particular, to a SIM card communication circuit, a related apparatus, and a control method.

BACKGROUND

In a communication network, a subscriber identity module (subscriber identification module, SIM card) is not only a subscriber identification card, but also a service carrier. An ESIM card is an embedded SIM card, which can integrate information about a SIM card into a device chip. Compared with a physical SIM card, the ESIM card is similar to a virtual SIM card. On a terminal device to which the ESIM card is applicable, a user may choose an operator network and a package through software registration or direct purchase without a need for the user to insert the physical SIM card.

However, the ESIM card has shortcomings in universality.

SUMMARY

Embodiments of this application provide a SIM card communication circuit, a related apparatus, and a control method, which are applied to the field of terminal technologies. That an ESIM card and a physical SIM card share one group of SIM interfaces (that is, the group of SIM interfaces is connected to both an ESIM card chip and a card slot configured to assemble the physical SIM card) is implemented in a one-mounting-multiple manner. By controlling working statuses of different channels, when the ESIM card shares the group of SIM interfaces with the physical SIM card, a terminal device implements communication of the ESIM card or implements communication of the physical SIM card. Moreover, no SIM interface needs to be added to a processor, a size of the processor remains unchanged, and an occupied area remains unchanged. In addition, a circuit in which no ESIM chip is added and a circuit in which an ESIM chip is added can use a same processor. A co-layout design is convenient for production and reduces stock preparation difficulty of the processor. In this manner, no additional switch unit needs to be added, costs are relatively low, and an occupied area is relatively small.

According to a first aspect, an embodiment of this application provides a SIM card communication circuit. The method includes a processor, a first level conversion apparatus, a first card slot, and an ESIM chip; both an input port of the first level conversion apparatus and the ESIM chip are connected to the processor, and an output port of the first level conversion apparatus is connected to the first card slot; and the processor is configured to: when receiving a first message, control the first level conversion apparatus to be enabled, and control the ESIM chip to be disabled, to implement a connection between the processor and a first physical SIM card in the first card slot, or the processor is configured to: when receiving a second message, control the first level conversion apparatus to be disabled, and control the ESIM chip to be enabled, to implement a connection between the processor and an ESIM card in the ESIM chip.

In this way, one group of SIM interfaces is connected to both the ESIM card chip and a card slot configured to assemble a physical SIM card. By controlling working statuses of different channels, when the ESIM card shares the group of SIM interfaces with the physical SIM card, a terminal device implements communication of the ESIM card or implements communication of the physical SIM card. Moreover, no SIM interface needs to be added to the processor, a size of the processor remains unchanged, and an occupied area remains unchanged. In addition, a circuit in which no ESIM chip is added and a circuit in which an ESIM chip is added can use a same processor. A co-layout design is convenient for production and reduces stock preparation difficulty of the processor. In this manner, no additional switch unit needs to be added, costs are relatively low, and an occupied area is relatively small.

Optionally, the processor is specifically configured to: when receiving the first message, control the first level conversion apparatus to be enabled, and control the ESIM chip to be in a high impedance state, to implement a connection between the processor and the first physical SIM card in the first card slot; or the processor is configured to: when receiving the second message, control the first level conversion apparatus to be in a high impedance state, and control the ESIM chip to be enabled, to implement a connection between the processor and the ESIM card in the ESIM chip.

In this way, the ESIM chip is in the high impedance state when being disabled, and does not have a feedback on the processor, thereby reducing impact on communication of the physical SIM card; or the first level conversion apparatus is in the high impedance state when being disabled, and does not have a feedback on the processor, thereby reducing impact on communication of the ESIM card.

Optionally, the first level conversion apparatus further includes a port configured to receive a first enable signal, and the ESIM chip further includes a port configured to receive a second enable signal; and the processor is specifically configured to: when receiving the first message, separately output the first enable signal of a first level and the second enable signal of a second level, where the first enable signal of the first level is used to control the first level conversion apparatus to be enabled, and the second enable signal of the second level is used to control the ESIM chip to be in the high impedance state; or the processor is specifically configured to: when receiving the second message, separately output the first enable signal of a third level and the second enable signal of a fourth level, where the first enable signal of the third level is used to control the first level conversion apparatus to be in the high impedance state, and the second enable signal of the fourth level is used to control the ESIM chip to be enabled.

In this way, the enable signal controls a working status (enabling or disabling) of the ESIM chip and a working status (enabling or disabling) of the first level conversion apparatus. This control manner is simple and easy to implement.

Optionally, the first level is different from the second level, and the third level is different from the fourth level.

Optionally, the first level is the same as the second level, and the third level is the same as the fourth level.

In this way, levels of the two enable signals are the same, and logic is simple, which is convenient for controlling by the processor.

Optionally, the first enable signal and the second enable signal are from a same port of the processor, or the first enable signal and the second enable signal are from different ports of the processor.

In this way, the first enable signal and the second enable signal are from a same port of the processor, which is convenient for controlling by the processor.

Optionally, the processor includes a first port, a second port, and a third port, the first port is configured to transmit a data DATA signal, the second port is configured to transmit a reset RST signal, and the third port is configured to transmit a clock CLK signal; the first level conversion apparatus includes a fourth port, a fifth port, a sixth port, a seventh port, an eighth port, and a ninth port; the first card slot includes a tenth port, an eleventh port, and a twelfth port; the ESIM chip includes a thirteenth port, a fourteenth port, and a fifteenth port; and the first port, the second port, and the third port are respectively connected to the fourth port, the fifth port, and the sixth port; the first port, the second port, and the third port are further respectively connected to the thirteenth port, the fourteenth port, and the fifteenth port; and the seventh port, the eighth port, and the ninth port are respectively connected to the eleventh port, the twelfth port, and the thirteenth port.

In this way, a DATA signal, a reset RST signal, and a clock CLK signal can be transmitted between the processor and the physical SIM card; and a DATA signal, a reset RST signal, and a clock CLK signal can be transmitted between the processor and the ESIM card.

Optionally, the circuit further includes a second card slot, and the second card slot is connected to the processor.

In this way, the processor can further communicate with a second physical SIM card.

Optionally, the second card slot includes a sixteenth port, a seventeenth port, and an eighteenth port; the processor further includes a nineteenth port, a twentieth port, and a twenty-first port, where the nineteenth port is configured to transmit a DATA signal, the twentieth port is configured to transmit a RST signal, and the twenty-first port is configured to transmit a CLK signal; and the sixteenth port, the seventeenth port, and the eighteenth port are respectively connected to the nineteenth port, the twentieth port, and the twenty-first port, to implement a connection between the processor and the second physical SIM card in the second card slot.

In this way, a DATA signal, a reset RST signal, and a clock CLK signal can be transmitted between the processor and the physical SIM card.

Optionally, the circuit further includes a second level conversion apparatus; and the second level conversion apparatus is located between the processor and the second card slot.

In this way, communication between the processor and the second physical SIM card in the second card slot can be implemented by using the second level conversion apparatus when voltage specifications are different or the same. The second card slot may be adapted to assemble different types of SIM cards, increasing practicality and applicability of the terminal device.

According to a second aspect, an embodiment of this application provides a terminal device. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer having a wireless transceiver function, a virtual reality (virtual reality. VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

The terminal device includes the SIM communication circuit according to any one in the first aspect, and the circuit is configured to implement communication between a processor and a first physical SIM card, or is configured to implement communication between the processor and an ESIM card.

According to a third aspect, an embodiment of this application provides a SIM card control method. The method includes: The processor receives first information used to indicate to select a first physical SIM card; and the processor controls, based on the first information, a first level conversion apparatus to be enabled, and controls an ESIM chip to be disabled; or the processor receives second information used to indicate to select the ESIM card; and the processor controls, based on the second information, the first level conversion apparatus to be disabled, and controls the ESIM chip to be enabled.

Optionally, that the processor controls, based on the first information, a first level conversion apparatus to be enabled, and controls an ESIM chip to be disabled includes: the processor outputs a first enable signal of a first level and a second enable signal of a second level based on the first information, where the first enable signal of the first level is used to control the first level conversion apparatus to be enabled, and the second enable signal of the second level is used to control the ESIM chip to be in a high impedance state; and that the processor controls, based on the second information, the first level conversion apparatus to be disabled, and controls the ESIM chip to be enabled includes: the processor outputs the first enable signal of a third level and the second enable signal of a fourth level based on the first information.

According to a fourth aspect, an embodiment of this application provides a SIM card control method, applied to a terminal device. The method includes: The terminal device displays a first interface, where the first interface includes a first control and a second control; the terminal device receives a first operation for the first control; and in response to the first operation, the terminal device controls a first level conversion apparatus to be enabled, and controls an ESIM chip to be disabled; or the terminal device receives a second operation for the second control; and in response to the second operation, the terminal device controls the first level conversion apparatus to be disabled, and controls the ESIM chip to be enabled.

The first interface may correspond to an interface shown in FIG. 7. The first operation may be an operation such as tapping or touching by a user, or may be any other operation such as a voice control operation, which is not limited herein. The second operation may be an operation such as tapping or touching by a user, or may be any other operation such as a voice control operation, which is not limited herein.

Optionally, that in response to the first operation, the terminal device controls a first level conversion apparatus to be enabled, and controls an ESIM chip to be disabled includes: the processor outputs a first enable signal of a first level and a second enable signal of a second level, where the first enable signal of the first level is used to control the first level conversion apparatus to be enabled, and the second enable signal of the second level is used to control the ESIM chip to be in a high impedance state; and that in response to the second operation, the terminal device controls the first level conversion apparatus to be disabled, and controls the ESIM chip to be enabled includes: the processor controls the first level conversion apparatus to be disabled, and controls the ESIM chip to be enabled includes: the processor outputs the first enable signal of a third level and the second enable signal of a fourth level based on the first information.

According to a fifth aspect, an embodiment of this application provides a terminal device. The terminal device includes a processor and a memory. The memory stores computer executable instructions. The processor executes the computer execution instructions stored in the memory, so that the terminal device performs the method according to the third aspect or the method according to the fourth aspect.

According to a sixth aspect, an embodiment of this application provides a computer-readable storage medium, and the computer-readable storage medium stores a computer program. The computer program can be executed by the processor to implement the method according to the third aspect or the method according to the fourth aspect.

According to a seventh aspect, an embodiment of this application provides a computer program product. The computer program product includes a computer program, and when the computer program is run, a computer is enabled to perform the method according to the third aspect or the method according to the fourth aspect.

According to an eighth aspect, an embodiment of this application provides a chip, and the chip includes a processor. The processor is configured to invoke a computer program in a memory to perform the method according to the third aspect or the method according to the fourth aspect.

It should be understood that the second aspect to the eighth aspect of this application correspond to the technical solution of the first aspect of this application, and the beneficial effects achieved by each aspect and the corresponding feasible implementations are similar. Details are not described again.

BRIEF DESCRIPTION OF DRAWINGS

FIG. 5 is a schematic flowchart of a SIM card control method according to an embodiment of this application;

FIG. 6 is a schematic flowchart of a SIM card control method according to an embodiment of this application.

DESCRIPTION OF EMBODIMENTS

Figure 1:
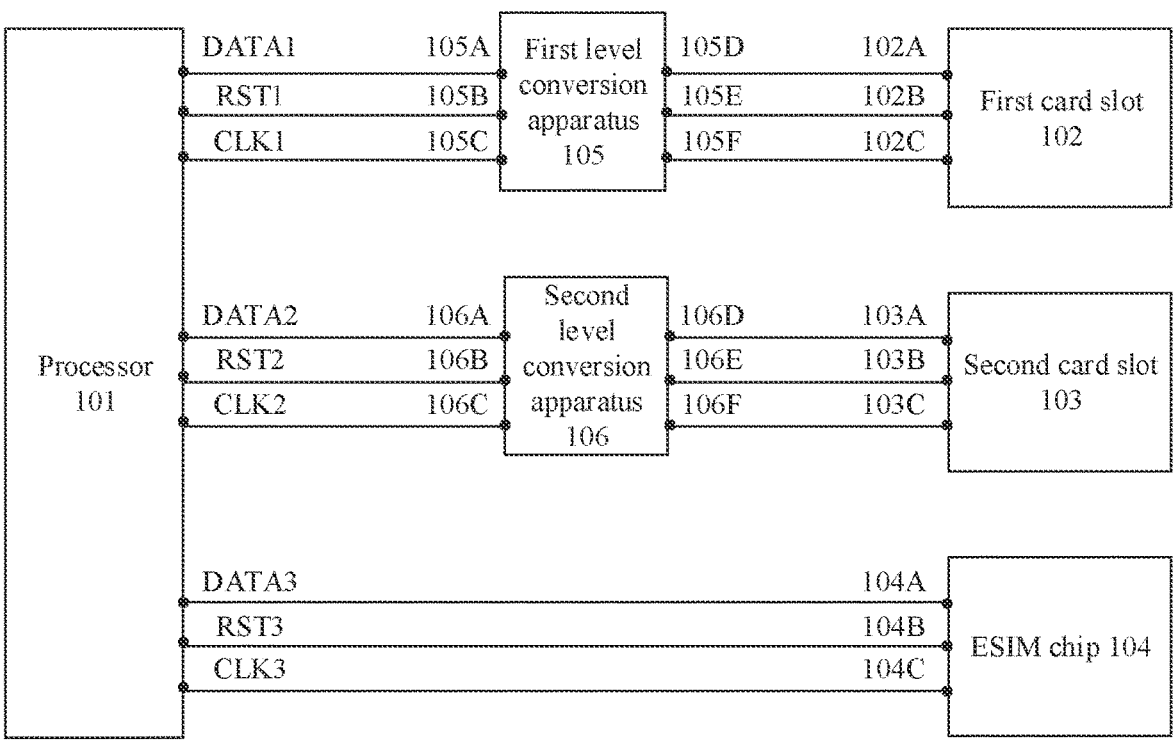
FIG. 1 is a schematic diagram of a structure of a circuit in a possible design.

To clearly describe technical solutions in embodiments of this application, in embodiments of this application, a word such as "exemplarily" or "for example" is used to represent an example, an illustration, or a description. Any embodiment or design solution described as "exemplarily" or "for example" in this application should not be construed as being preferred or advantageous over other embodiments or design solutions. Exactly, use of the word such as "exemplarily" or "for example" is intended to present related concepts in a specific manner.

In embodiments of this application, "at least one" means one or more, and "a plurality of" means two or more. The term "and/or" describes an association relationship between associated objects, and indicates that three relationships may exist. For example. A and/or B may indicate the following cases: Only A exists, both A and B exist, and only B exists, where A and B may be singular or plural. The character "I" usually indicates an "or" relationship between the associated objects. "At least one of the following items" or a similar expression means any combination of these items, including any combination of a single item or a plurality of items. For example, at least one of a, b, or c may represent a, b, c, a-b, a-c, b-c, or a-b-c, where a, b, and c may be singular or plural.

It should be noted that in embodiments of this application, "when . . . " may be an instantaneous occurrence time of a case, or may be a period of time after occurrence of a case, and this is not specifically limited in embodiments of this application. In addition, a display interface provided in embodiments of this application is merely an example, and the display interface may further include more or less content.

For ease of understanding, example descriptions of some concepts related to the embodiments of this application are provided for reference.

1. Subscriber identity module (subscriber identification module, SIM card): The subscriber identity module card is a personal data card of a digital mobile phone with global system for mobile communications. The SIM card stores data of a user, an authentication method, and a key, which can be used by a communication network to authenticate an identity of the user. In addition, the user completes connection and information exchange with a communication system by using the SIM card. It may be understood that, in a communication network, the SIM card is not only a user identification card, but also a service carrier. The SIM card is configured to store user-related data, and is configured to perform identity verification for the user, to prevent an unauthorized user from entering a network, and the like.

In the embodiments of this application, the SIM card may also be referred to as a universal subscriber identity module (universal subscriber identity module, USIM), a universal integrated circuit card (universal integrated circuit card. UICC), a smart card, or the like.

2. Embedded-SIM card (embedded-SIM, ESIM card): The ESIM card may be embedded on a line board of a terminal device, and cannot be separated from the terminal device.

Compared with a physical SIM card, the ESIM card is a blank SIM chip directly welded in the terminal device. A user may perform writing to the terminal device in an over-the-air manner, to implement a same function as the physical SIM card.

3. High impedance state (high impedance state): The high impedance state indicates that a node in a circuit has a relatively higher impedance than another point in the circuit. During circuit analysis, the high impedance state may be understood as an open circuit or a floating disconnection. It should be noted that when a component is in the high impedance state, there is no feedback to the circuit, and a result is similar to that the component is not connected. A SIM card communication circuit in the embodiments of this application may be applied to an electronic device having a communication function. The electronic device includes a terminal device, which also be referred to as a terminal (terminal), user equipment (user equipment, UE), a mobile station (mobile station, MS), a mobile terminal (mobile terminal, MT), or the like. The terminal device may be a mobile phone (mobile phone), a smart TV a wearable device, a tablet computer (Pad), a computer having a wireless transceiver function, a virtual reality (virtual reality, VR) terminal device, an augmented reality (augmented reality. AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. A specific technology and a specific device form that are used by the terminal device are not limited in embodiments of this application.

In the communication network, the SIM card is not only the user identification card, but also the service carrier. The ESIM card is an embedded SIM card, which can integrate information about a SIM card into a device chip. Compared with the physical SIM card, the ESIM card is similar to a virtual SIM card. On a terminal device to which the ESIM card is applicable, the user may choose an operator network and a package through software registration or direct purchase without a need for the user to insert the physical SIM card.

However, the ESIM card has shortcomings in universality. Therefore, it is necessary to add a compatible design to a current terminal device, to ensure applicability and universality of the terminal device.

In a possible design 1, a terminal device having a physical SIM card, such as a mobile phone, implements a connection between a processor and the ESIM card by adding one group of SIM interfaces, to implement a compatible design of the physical SIM card and the ESIM card.

For example, FIG. 1 is a schematic diagram of a switching circuit between a SIM card and an ESIM in a possible design. For example, the terminal device is provided with two physical SIM cards. As shown in FIG. 1, the circuit includes a processor 101, a first card slot 102, a second card slot 103, an ESIM chip 104, a first level conversion apparatus 105, and a second level conversion apparatus 106.

In the circuit shown in FIG. 1, a SIM interface of the processor 101 is separately connected to an input port of the first level conversion apparatus 105, an input port of the second level conversion apparatus 106, and the ESIM chip 204; an output port of the first level conversion apparatus 105 is connected to the first card slot 202; and an output port of the second level conversion apparatus 206 is connected to the second card slot 203.

The first card slot 102 is configured to assemble a first physical SIM card. The first card slot 102 includes three input ports, which are respectively a port (port 102A) configured to transmit a data signal, a port (port 102B) configured to transmit a reset signal, and a port (port 102C) configured to transmit a clock signal.

The second card slot 103 is configured to assemble a second physical SIM card. The second card slot 103 includes three input ports, which are respectively a port (port 103A) configured to transmit a data signal, a port (port 103B) configured to transmit a reset signal, and a port (port 103C) configured to transmit a clock signal.

The ESIM chip 104 includes three input ports, which are respectively a port (port 104A) configured to transmit a data signal, a port (port 104B) configured to transmit a reset signal, and a port (port 104C) configured to transmit a clock signal. A specific model, specification, and the like of the ESIM chip 104 are not limited in an embodiment of this application.

The processor 101 is configured to interact with a communication network by using any one of the first physical SIM card, the second physical SIM card, and the ESIM card, to implement functions such as calling and data communication.

The first level conversion apparatus 105 is configured to convert a voltage, to implement communication when a voltage specification of the processor 101 is different from a voltage specification of the first physical SIM card in the first card slot 102. The first level conversion apparatus 105 includes three input ports and three output ports, the input ports are respectively a port 105A, a port 105B, and a port 105C, and the output ports are respectively 105D, a port 105E, and a port 105F.

The second level conversion apparatus 106 is configured to convert a voltage, to implement communication when the voltage specification of the processor 101 is different from a voltage specification of the first physical SIM card in the second card slot 103. The second level conversion apparatus 106 includes three input ports and three output ports, the input ports are respectively a port 106A, a port 106B, and a port 106C, and the output ports are respectively 106D, a port 106E, and a port 106F.

The processor 101 may be a system on chip (system on chip. SOC), a micro control unit (micro control unit, MCU), or the like. The processor 101 may also be referred to as a controller. A specific structure and the like of the processor 101 are not limited in this embodiment of this application.

As shown in FIG. 1, the processor 101 includes three groups of SIM interfaces, which are respectively used to connect the first card slot 102, the second card slot 103, and the ESIM chip 104. Each group of SIM interfaces includes three ports, which are respectively a port (which may be referred to as a DATA port or an I/O port) configured to transmit a data signal, a port (which may be referred to as a RESET port or a RST port) configured to transmit a reset signal, and a port (which may be referred to as a CLK port) configured to transmit a clock signal.

For example, the processor 101 includes three groups of SIM interfaces, and a total of nine ports are respectively a port DATA1, a port RST1, a port CLK1, a port DATA2, a port RST2, a port CLK2, a port DATA3, a port RST3, and a port CLK3.

The port DATA1, the port RST1, and the port CLK1 are respectively connected to the three input ports of the first level conversion apparatus 105. The three output ports of the first level conversion apparatus 105 are respectively connected to the three ports (the port 102A, the port 102B, and the port 102C) of the first card slot 102, to implement a connection between the processor and the first physical SIM card.

The port DATA2, the port RST2, and the port CLK2 are respectively connected to the three input ports of the second level conversion apparatus 106. The three output ports of the second level conversion apparatus 106 are respectively connected to the three ports (the port 103A, the port 103B, and the port 103C) of the second card slot 103, to implement a connection between the processor and the second physical SIM card.

The port DATA3, the port RST3, and the port CLK3 are respectively connected to the three ports (the port 104A, the port 104B, and the port 104C) of the ESIM chip 104, to implement a connection between the processor and the ESIM card.

In this way, the terminal device can use the first physical SIM card, the second physical SIM card, and the ESIM card for communication.

However, adding the SIM interfaces may increase a size of the processor, increase an occupied area, and further increase a volume of the terminal device. In addition, a design of a processor in a circuit in which an ESIM chip is added is different from that of a processor in a circuit in which no ESIM chip is added, which increases stock preparation difficulty, and is not conducive to production of the terminal device.

In a possible design 2, a terminal device having a physical SIM card, such as a mobile phone, implements a connection between the processor and the ESIM card or a connection between the processor and the second physical SIM card in the second card slot through control of a switch unit, to implement a compatible design of the physical SIM card and the ESIM card.

Figure 2:
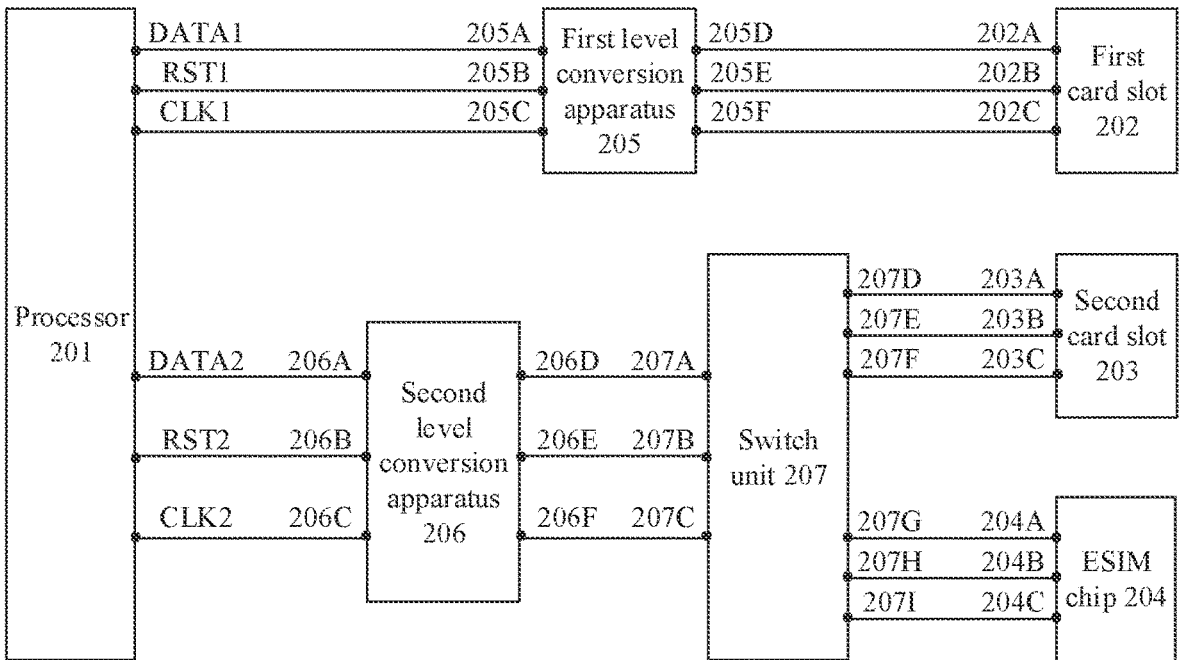
FIG. 2 is a schematic diagram of a structure of a circuit in a possible design.

For example, FIG. 2 is a schematic diagram of a communication circuit between a SIM card and an ESIM in a possible design. For example, the terminal device is provided with two physical SIM cards. As shown in FIG. 2, the circuit includes a processor 201, a first card slot 202, a second card slot 203, an ESIM chip 204, a first level conversion apparatus 205, a second level conversion apparatus 206, and a switch unit 207.

In the circuit shown in FIG. 2, two groups of SIM interfaces of the processor 201 are respectively connected to an input port of the first level conversion apparatus 205 and an input port of the second level conversion apparatus 206; an output port of the first level conversion apparatus 205 is connected to the first card slot 202; an output port of the second level conversion apparatus 206 is connected to an input port of the switch unit 207; and a first output port and a second output port of the switch unit 207 are respectively connected to the second card slot 203 and the ESIM chip 204.

The first card slot 202 is configured to assemble a first physical SIM card. The first card slot 202 includes three input ports, which are respectively a port (port 202A) configured to transmit a data signal, a port (port 202B) configured to transmit a reset signal, and a port (port 202C) configured to transmit a clock signal.

The second card slot 203 is configured to assemble a second physical SIM card. The second card slot 203 includes three input ports, which are respectively a port (port 203A) configured to transmit a data signal, a port (port 203B) configured to transmit a reset signal, and a port (port 203C) configured to transmit a clock signal.

The ESIM chip 204 includes three input ports, which are respectively a port (port 204A) configured to transmit a data signal, a port (port 204B) configured to transmit a reset signal, and a port (port 204C) configured to transmit a clock signal. The ESIM chip 204 may be an SN110U chip, or may be an SN220U chip. A specific model, specification, and the like of the ESIM chip 204 are not limited in this embodiment of this application.

The first level conversion apparatus 205 is configured to convert a voltage, to implement communication when a voltage specification of the processor 201 is different from a voltage specification of the first physical SIM card in the first card slot 202. The first level conversion apparatus 205 includes three input ports and three output ports, the input ports are respectively a port 205A, a port 205B, and a port 205C, and the output ports are respectively 205D, a port 205E, and a port 205F.

The second level conversion apparatus 206 is configured to convert a voltage, to implement communication when the voltage specification of the processor 201 is different from a voltage specification of the first physical SIM card in the second card slot 203. The second level conversion apparatus 206 includes three input ports and three output ports, the input ports are respectively a port 206A, a port 206B, and a port 206C, and the output ports are respectively 206D, a port 206E, and a port 206F.

The switch unit 207 is configured to connect to the second level conversion apparatus 206, and then connect to the second card slot 203, to implement a connection between the processor 201 and the second physical SIM card; or is configured to connect to the ESIM chip 204, to implement a connection between the processor 201 and the ESIM card.

The processor 201 is configured to interact with a communication network by using any one of the first physical SIM card, the second physical SIM card, and the ESIM card, to implement functions such as calling and data communication of the terminal device.

In this embodiment of this application, the processor 201 may be a system on chip (system on chip, SOC), a micro control unit (micro control unit, MCU), or the like. The processor may also be referred to as a controller. A specific structure and the like of the processor 201 are not limited in this embodiment of this application.

As shown in FIG. 2, the processor 201 includes two groups of SIM interfaces, which are respectively used to connect to the first card slot 202 and used to connect to the second card slot 203 or the ESIM chip 204. Each group of SIM interfaces includes three ports, which are respectively a port (which may be referred to as a DATA port or an I/O port) configured to transmit a data signal, a port (which may be referred to as a RST port or a RESET port) configured to transmit a reset signal, and a port (which may be referred to as a CLK port) configured to transmit a clock signal.

Specifically, the processor 201 includes two groups of SIM interfaces, one group of SIM interfaces includes a port DATA1, a port RST1, and a port CLK1, and the other group of SIM interfaces includes a port DATA2, a port RST2, and a port CLK2.

In this embodiment of this application, the port DATA1, the port RST1, and the port CLK1 are respectively connected to three ports (the port 202A, the port 202B, and the port 202C) of the first card slot 202 by using the first level conversion apparatus 205, to implement a connection between the processor 201 and the first physical SIM card. The port DATA2, the port RST2, and the port CLK2 are respectively connected to three input ports of the switch unit 207 by using the second level conversion apparatus 206.

The switch unit 207 includes three input ports and six output ports. The three input ports of the switch unit 207 are respectively a port 207A, a port 207B, and a port 207C. The six output ports of the switch unit 207 are respectively a port 207D, a port 207E, a port 207F, a port 207G, a port 207H, and a port 207I. It may be understood that the port 207D, the port 207E, and the port 207F may be referred to as the first output port of the switch unit. The port 207G, the port 207H, and the port 207I may be referred to as the second output port of the switch unit.

It may be understood that the switch unit 207 may include one or more switches. A specific structure of the switch unit, a quantity of switches in the switch unit, a switch type, and the like are not limited in this embodiment of this application. For example, when the switch unit 207 includes one switch, the switch may be a three-channel switch (for example, a triple-pole double-throw switch). When including two switches, the switch unit 207 may include one double-channel switch (for example, a double-pole double-throw switch) and one single-channel switch (for example, a triple-pole double-throw switch), or may include two double-channel switches.

It should be noted that the port 207D, the port 207E, and the port 207F in the switch unit 207 are respectively connected to three ports (the port 203A, the port 203B, and the port 203C) of the second card slot 203, to implement a connection between the processor 201 and the second physical SIM card. The port 207G, the port 207H, and the port 207I in the switch unit 207 are respectively connected to three ports (the port 204A, the port 204B, and the port 204C) of the ESIM chip 204, to implement a connection between the processor 201 and the ESIM card.

If the port 207A, the port 207B, and the port 207C in the switch unit 207 are respectively connected to the port 207D, the port 207E, and the port 207F in the switch unit 207, the processor 201 transmits a DATA signal to the second physical SIM card in the second card slot by using the port DATA2, the port 207A, the port 207D, and the port 203A; the processor 201 transmits a RST signal to the second physical SIM card in the second card slot by using the port RST2, the port 207B, the port 207E, and the port 203B; and the processor 201 transmits a CLK signal to the second physical SIM card in the second card slot by using the port CLK2, the port 207C, the port 207F, and the port 203C. In this way, the terminal device can implement communication between the processor and the second physical SIM card.

If the port 207A, the port 207B, and the port 207C in the switch unit 207 are respectively connected to the port 207G, the port 207H, and the port 207I in the switch unit 207, the processor 201 transmits a DATA signal to the ESIM card in the ESIM chip by using the port DATA2, the port 207A, the port 207G, and the port 204A; the processor 201 transmits a RST signal to the ESIM card in the ESIM chip by using the port RST2, the port 207B, the port 207H, and the port 204B; and the processor 201 transmits a CLK signal to the ESIM card in the ESIM chip by using the port CLK2, the port 207C, the port 207I, and the port 204B.

In this way, the terminal device can implement communication between the processor and the ESIM card.

In summary, changing a connection manner inside the switch unit implements switching between the second physical SIM card and the ESIM card, increasing practicality and applicability of the terminal device. In addition, the processor is not changed, and the circuit in which no ESIM chip is added and the circuit in which an ESIM chip is added can use a same processor. A co-layout design can reduce stock up difficulty of the processor and reduce production costs.

However, the switch unit needs to be added, which may cause a large occupied area of the terminal device. In addition, adding the switch unit further increases costs of the terminal device.

Based on this, an embodiment of this application provides a SIM card communication circuit, to implement, in a one-mounting-multiple manner, that an ESIM card and a physical SIM card share one group of SIM interfaces (that is, the group of SIM interfaces is connected to both an ESIM card chip and a card slot configured to assemble the physical SIM card). By controlling working statuses of different channels, when the ESIM card shares the group of SIM interfaces with the physical SIM card, the terminal device implements communication of the ESIM card or implements communication of the physical SIM card. Moreover, no SIM interface needs to be added to the processor, a size of the processor remains unchanged, and an occupied area remains unchanged. In addition, the circuit in which no ESIM chip is added and the circuit in which an ESIM chip is added can use a same processor. A co-layout design is convenient for production and reduces stock preparation difficulty of the processor. In this manner, no additional switch unit needs to be added, costs are relatively low, and an occupied area is relatively small.

Figure 3:
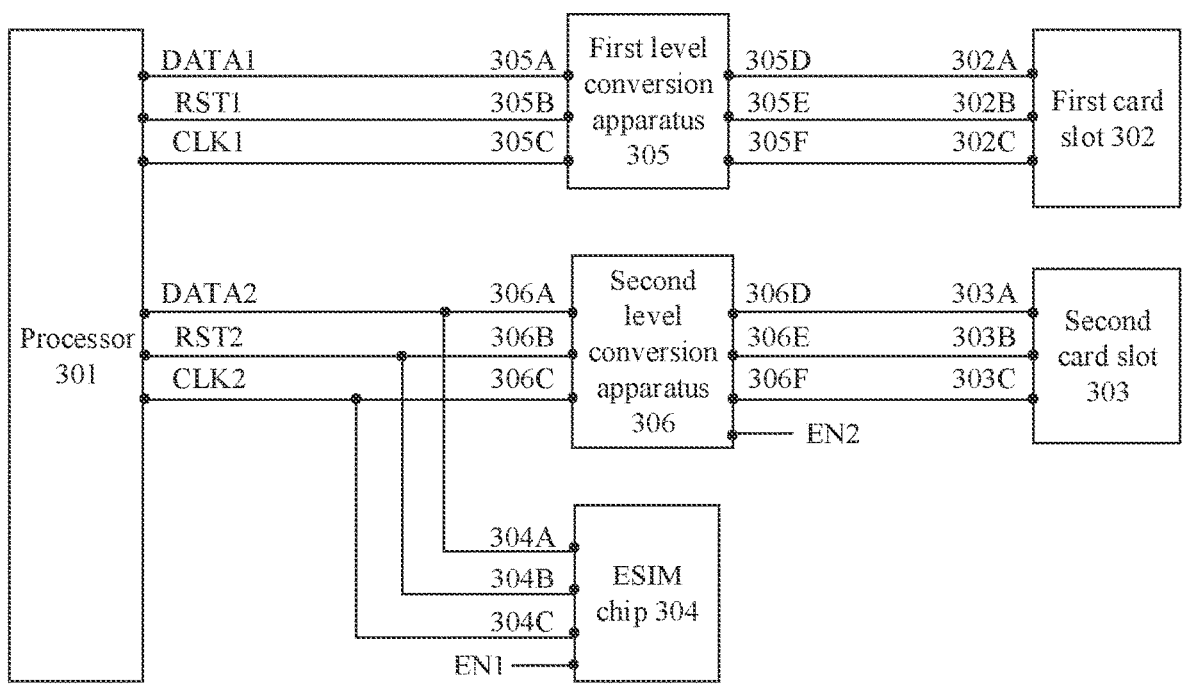
FIG. 3 is a schematic diagram of a connection of a SIM card communication circuit according to an embodiment of this application.
Figure 4:
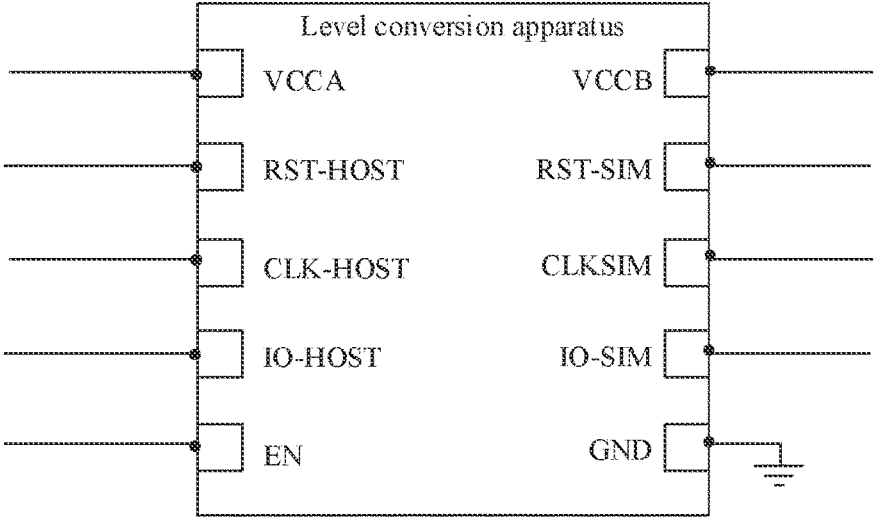
FIG. 4 is a schematic diagram of a structure of a level conversion apparatus according to an embodiment of this application.

The following describes the SIM card communication circuit provided in this embodiment of this application with reference to FIG. 3 and FIG. 4.

For example, FIG. 3 is a schematic diagram of a structure of a SIM card communication circuit according to an embodiment of this application. As shown in FIG. 3, the circuit includes a processor 301, a first card slot 302, a second card slot 303, an ESIM chip 304, a first level conversion apparatus 305, and a second level conversion apparatus 306. The processor 301 includes a SIM interface 1 and a SIM interface 2.

In the circuit shown in FIG. 3, the SIM interfaces of the processor 301 are respectively connected to an input port of the first level conversion apparatus 305 and an input port of the second level conversion apparatus 306, and the SIM interface connected to the second level conversion apparatus 306 is further connected to the ESIM chip 304; an output port of the first level conversion apparatus 305 is connected to the first card slot 302; and an output port of the second level conversion apparatus 306 is connected to the second card slot 303.

It may be understood that the ESIM card chip may be connected to the input port of the second level conversion apparatus 306, or may be connected to the SIM interface connected to the input port of the second level conversion apparatus 306, or may be connected to any location on a first connection line, where the first connection line is a connection line between the SIM interface of the processor 301 and the input port of the second level conversion apparatus 306. Alternatively, it may be understood that a circuit of the ESIM card chip and a circuit of a second physical SIM card are connected in parallel, and the circuit of the second physical SIM card includes the second card slot 303 and the second level conversion apparatus 306.

The first card slot 302 is configured to assemble a first physical SIM card. The first card slot 302 includes three input ports, which are respectively a port (port 302A) configured to transmit a data signal, a port (port 302B) configured to transmit a reset signal, and a port (port 302C) configured to transmit a clock signal.

The second card slot 303 is configured to assemble the second physical SIM card. The second card slot 303 includes three input ports, which are respectively a port (port 303A) configured to transmit a data signal, a port (port 303B) configured to transmit a reset signal, and a port (port 303C) configured to transmit a clock signal.

It may be understood that the first physical SIM card may be a Nano SIM card, a Micro SIM card, or the like, and the second physical SIM card may be a Nano SIM card, a Micro SIM card, or the like. This is not limited in this embodiment of this application. A specification of the first physical SIM card may be the same as or different from a specification of the second physical SIM card. This is not limited in this embodiment of this application.

The ESIM chip 304 includes three input ports, which are respectively a port (port 304A) configured to transmit a data signal, a port (port 304B) configured to transmit a reset signal, and a port (port 304C) configured to transmit a clock signal. The ESIM chip 304 may be an SN110U chip, or may be an SN220U chip. A specific model, specification, and the like of the ESIM chip 304 are not limited in this embodiment of this application.

The first level conversion apparatus 305 is configured to convert a voltage, to implement communication when a voltage specification of the processor 301 is different from a voltage specification of the first physical SIM card in the first card slot 302. The first level conversion apparatus 305 includes three input ports and three output ports, the input ports are respectively a port 305A, a port 305B, and a port 305C, and the output ports are 305D, a port 305E, and a port 305F.

In a possible implementation, the circuit may include no first level conversion apparatus. For example, the circuit shown in FIG. 3 does not include the first level conversion apparatus 305. In this way, the first level conversion apparatus in the circuit can be omitted, thereby reducing costs and reducing a volume of a terminal device.

The second level conversion apparatus 306 is configured to convert a voltage, to implement communication when the voltage specification of the processor 301 is different from a voltage specification of the first physical SIM card in the second card slot 303. The second level conversion apparatus 306 includes three input ports and three output ports, the input ports are respectively a port 306A, a port 306B, and a port 306C, and the output ports are respectively 306D, a port 306E, and a port 306F.

For example, FIG. 4 is a schematic diagram of a structure of a level conversion apparatus according to an embodiment of this application. As shown in FIG. 4, the level conversion apparatus includes 10 ports, which are respectively ports (a port RST-HOST, a port CLK-HOST, and a port IO-HOST) configured to input signals, ports (a port RST-SIM, a port CLK-SIM, and a port IO-SIM) configured to output signals, ports (a port VCCA and a port VCCB) configured to provide working voltages, a port (port EN, which may also be labeled as a port S/SEL) configured to input an enable signal, and a port (port END) configured for grounding. An arrangement sequence, an arrangement manner, and the like of the ports m the level conversion apparatus are not limited in this embodiment of this application.

It may be understood that the port 306A, the port 306B, the port 306C, the port 306D, the port 306E, the port 306F, and a port EN2 of the second level conversion apparatus 306 respectively correspond to the port IO-HOST, the port RST-HOST, the port CLK-HOST, the port IO-SIM, a port RST-SIM, and the port CLK-SIM and the port EN that are in the level conversion apparatus shown in FIG. 4.

The processor 301 is configured to interact with a communication network by using any one of the first physical SIM card, the second physical SIM card, and an ESIM card, to implement functions such as calling and data communication of the terminal device. In this embodiment of this application, the processor 301 may be a system on chip (system on chip, SOC), a micro control unit (micro control unit, MCU), or the like. The processor may also be referred to as a controller. A specific structure and the like of the processor 301 are not limited in this embodiment of this application.

In this embodiment of this application, the processor 301 includes two groups of SIM interfaces, which are respectively used to connect to the first card slot 302 and used to connect to the second card slot 303 or the ESIM chip 304. Each group of SIM interfaces includes three ports, which are respectively a port (which may be referred to as a DATA port or an I/O port) configured to transmit a data signal, a port (which may be referred to as a RST port or a RESET port) configured to transmit a reset signal, and a port (which may be referred to as a CLK port) configured to transmit a clock signal. Specifically, the processor 301 includes two groups of SIM interfaces, one group of SIM interfaces includes a port DATA1, a port RST1, and a port CLK1, and the other group of SIM interfaces includes a port DATA2, a port RST2, and a port CLK2.

In this embodiment of this application, the port DATA1, the port RST1, and the port CLK1 are respectively connected to three ports (the port 302A, the port 302B, and the port 302C) of the first card slot 302 by using the first level conversion apparatus 305, to implement a connection between the processor 301 and the first physical SIM card. The port DATA2, the port RST2, and the port CLK2 are respectively connected to three ports (the port 303A, the port 303B, and the port 303C) of the second card slot 303 by using the second level conversion apparatus 306, to implement a connection between the processor 301 and the second physical SIM card. The port DATA2, the port RST2, and the port CLK2 are further respectively connected to three ports (the port 304A, the port 304B, and the port 304C) of the ESIM chip 304, to implement a connection between the processor 301 and the ESIM card.

It should be noted that, in this embodiment of this application, a working status of the second level conversion apparatus is opposite to that of the ESIM chip. For example, in the circuit shown in FIG. 3, when the second level conversion apparatus 306 is enabled, the ESIM chip is disabled, and the processor 301 is connected to the second physical SIM card by using the second level conversion apparatus 306 and the second card slot 303. When the second level conversion apparatus is disabled, the ESIM chip is enabled, and the processor 301 is connected to the ESIM chip 304.

It may be understood that when the second level conversion apparatus and the ESIM chip are enabled simultaneously, the processor cannot accurately identify the SIM card, and consequently communication of the SIM card cannot be implemented. Even if the second card slot is not assembled with a physical SIM card, signal quality during communication of the ESIM card may be reduced, resulting in poor user experience.

In this embodiment of this application, the processor 301 is specifically configured to: when receiving a first message used to indicate to select the second physical SIM card, control the second level conversion apparatus to be enabled, and control the ESIM chip to be disabled, to implement a connection between the processor and the second physical SIM card in the second card slot.

Alternatively, the processor is specifically configured to: when receiving a second message used to indicate to select the ESIM card, control the second level conversion apparatus to be disabled, and control the ESIM chip to be enabled, to implement a connection between the processor and the ESIM card in the ESIM chip.

It may be understood that when the ESIM chip is disabled, the ESIM chip may be in a pull-down state with impedance, may be in a suspended state (keep suspended), or may be in a high impedance state. When the second level conversion apparatus is disabled, the second level conversion apparatus may be in a pull-down state with impedance, may be in a suspended state (keep suspended), or may be in a high impedance state.

When the ESIM chip is in the pull-down state, an impedance value may be 100K ohms, or may be another value. This is not limited in this embodiment of this application. When the second level conversion apparatus is in the pull-down state, an impedance value may be 100K ohms, or may be another value. This is not limited in this embodiment of this application.

In a possible implementation, in the circuit shown in FIG. 3, when the second level conversion apparatus 306 is enabled, the processor 301 is connected to the second physical SIM card by using the second level conversion apparatus 306 and the second card slot 303, and the ESIM chip is in the high impedance state. When the second level conversion apparatus is in the high impedance state, the processor 301 is connected to the ESIM chip 304, and the ESIM chip is enabled.

It should be noted that the high impedance state is a type of disabling. When being disabled, a component maintains a high impedance state, and there is no feedback to the circuit, which does not affect another component in the circuit.

It may be understood that when the ESIM chip is in the high impedance state, there is no feedback to the circuit, which does not affect communication between the processor and the second physical SIM card. When the second level conversion apparatus is in the high impedance state, there is no feedback to the circuit, which does not affect communication between the processor and the ESIM card. In this way, interference during communication can be reduced, communication quality can be improved, and user experience can be improved.

In a possible implementation, the processor 301 is specifically configured to: when receiving a first message used to indicate to select the second physical SIM card, control the second level conversion apparatus to be enabled, and control the ESIM chip to be disabled, to implement a connection between the processor and the second physical SIM card in the second card slot.

Alternatively, the processor is specifically configured to: when receiving a second message used to indicate to select the ESIM card, control the first level conversion apparatus to be disabled, and control the ESIM chip to be enabled, to implement a connection between the processor and the ESIM card in the ESIM chip.

Based on the foregoing embodiment, the processor controls the working status of the second level conversion apparatus and the working status of the ESIM chip by using an enable signal or in any other manner.

For example, in the circuit shown in FIG. 3, the ESIM chip 304 further includes a port (port EN1) configured to control whether the ESIM chip 304 works. The second level conversion apparatus 306 further includes a port (the port EN2) configured to control whether the second level conversion apparatus 306 works.

In this embodiment of this application, the ESIM chip 304 may be enabled and start working when an enable signal EN1 is at a low level, and the ESIM chip 304 is disabled (for example, is in the high impedance state) and does not work when the enable signal EN1 is at a high level. Alternatively, the ESIM chip 304 may be enabled and start working when the enable signal EN1 is at a high level, and the ESIM chip 304 is disabled (for example, is in the high impedance state) and does not work when the enable signal EN1 is at a low level. A specific control manner of the enable signal to the ESIM chip 304 is not limited in this embodiment of this application.

In this embodiment of this application, the second level conversion apparatus 306 is enabled and starts working when an enable signal EN2 is at a low level, and the second level conversion apparatus 306 is disabled (for example, is in the high impedance state) and does not work when the enable signal EN2 is at a high level. Alternatively, the second level conversion apparatus 306 is enabled and starts working when the enable signal EN2 is at a high level, and the second level conversion apparatus 306 is disabled (for example, is in the high impedance state) and does not work when the enable signal EN2 is at a low level.

It may be understood that a port used to control whether to work may also be referred to as a port used to input an enable signal, or may be referred to as a port used to receive an enable signal. The enable signal may also be referred to as a level signal, a control signal, or the like. This is not limited in this embodiment of this application.

In a possible implementation 1, the enable signal EN1 and the enable signal EN2 are different signals.

For example, when the enable signal EN2 is at a low level and the enable signal EN1 is at a high level, the second level conversion apparatus 306 is disabled (for example, is in the high impedance state or the pull-down state with impedance), the ESIM chip 304 is enabled, and the processor communicates with the ESIM chip. When the enable signal EN2 is at a high level and the enable signal EN1 is at a low level, the second level conversion apparatus 306 is enabled, the ESIM chip 304 is disabled (for example, is in the high impedance state or the pull-down state with impedance), and the processor 301 communicates with the second physical SIM card in the second card slot 303 by using the second level conversion apparatus 306.

It may be understood that when the enable signal EN1 and the enable signal EN2 are different signals, the port EN1 and the port EN2 are connected to different ports of the processor.

In a possible implementation 2, the enable signal EN1 and the enable signal EN2 may be a same signal. In this way, it is convenient for the processor to control the enable signal EN1 and the enable signal EN2, thereby reducing a control error.

For example, when both the enable signal EN1 and the enable signal EN2 are at a low level, the second level conversion apparatus 306 is disabled (for example, is in the high impedance state or the pull-down state with impedance), the ESIM chip is enabled, and the processor communicates with the ESIM chip. When both the enable signal EN1 and the enable signal EN2 are at a high level, the ESIM chip 304 is disabled (for example, is in the high impedance state or the pull-down state with impedance), the second level conversion apparatus 306 is enabled, and the processor 301 communicates with the second physical SIM card in the second card slot 303 by using the second level conversion apparatus 306.

It may be understood that when the enable signal EN1 and the enable signal EN2 are a same signal, the port EN1 and the port EN2 may be connected to a same port of the processor, or may be connected to different ports of the processor. This is not limited in this embodiment of this application.

It should be noted that the ESIM chip 304 may be an independent chip, or may be integrated with another chip. For example, the ESIM chip 304 may be integrated with an NFC chip in the terminal device. In this way, occupation of a printed circuit board (PCB board) can be reduced, and a volume of the terminal device can be reduced. In addition, an NFC function corresponding to the NFC chip involves payment and the like, and security performance is relatively high, which may also meet a security performance requirement of the ESIM card.

It may be understood that the level conversion apparatus is usually enabled at a high level (which may be understood as being in the high impedance state when the enable signal is at a low level), and the NFC chip is usually enabled at a low level (which may be understood as being in the high impedance state when the enable signal is at a high level). Therefore, in the circuit shown in FIG. 3, when both the enable signal EN1 and the enable signal EN2 are at a low level, the second level conversion apparatus 306 is in the high impedance state and is disabled, and the processor communicates with the ESIM chip. When both the enable signal EN1 and the enable signal EN2 are at a high level, the ESIM chip 304 is in the high impedance state, the second level conversion apparatus 306 is enabled, and the processor 301 communicates with the second physical SIM card in the second card slot 303 by using the second level conversion apparatus 306.

In this embodiment of this application, the voltage specification of the processor is the same as a voltage specification of the ESIM chip. For example, if the SIM interface in the processor supports only 1.2 V, an ESIM chip of 1.2 V (for example, an SN220U chip) is used in the circuit. If the SIM interface in the processor supports only 1.8 V, an ESIM chip of 1.8 V (for example, an SN110U and an SN220U) is used in the circuit.

It may be understood that specific structures, models, and the like of the components such as the processor 301, the first card slot 302, the second card slot 303, the ESIM chip 304, the first level conversion apparatus 305, and the second level conversion apparatus 306 are not limited in this embodiment of this application.

It may be understood that the two groups of SIM interfaces of the processor in the circuit shown in FIG. 3 each support a plurality of physical SIM cards. In some embodiments, one of the two groups of SIM interfaces of the processor supports a plurality of physical SIM cards, and the other group supports only one physical SIM card. Therefore, when the SIM interface (the port DATA1, the port RST1, and the port CLK1) connected to the first card slot supports only one physical SIM card, the circuit shown in FIG. 3 does not include the first level conversion apparatus 305.

In this way, some physical components can be reduced, thereby reducing costs and reducing a volume of the terminal device.

It may be understood that the SIM card communication circuit in the foregoing embodiment is described by using two groups of SIM interfaces as examples. In some embodiments, the processor may include only one group of SIM interfaces. When the processor includes only one group of SIM interfaces, the circuit shown in FIG. 3 does not include the first card slot and ports (for example, the port DATA1, the port RST1, and the port CLK1 in the processor) connected to the first card slot.

It may be understood that, in the foregoing embodiment, that one group of SIM interfaces include three types of signals is used as an example for description. Therefore, components such as the input port of the level conversion apparatus, the output port of the level conversion apparatus, and the ESIM chip each include three ports used to transmit signals.

In the foregoing embodiment, different statuses of the second level conversion apparatus and the ESIM chip are controlled by using enable signals. The different statuses of the second level conversion apparatus and the ESIM chip may alternatively be controlled in any other manner. This is not limited in this embodiment of this application.

With development of technologies, one group of SIM interfaces may include more or fewer signals, and components such as the input port of the level conversion apparatus, the output port of the level conversion apparatus, and the ESIM chip each include another quantity of ports used to transmit signals. Quantities of ports that are of the components in the circuit and that are used to transmit signals are not limited in this embodiment of this application.

It may be understood that in the foregoing embodiment shown in FIG. 3, the ESIM chip shares one group of SIM interfaces with the second card slot. The ESIM chip may alternatively share one group of SIM interfaces with the first card slot, which has a similar circuit connection manner and a similar control method. Details are not described herein again.

The following describes a SIM card control method provided in an embodiment of this application with reference to FIG. 5 and FIG. 6.

For example, FIG. 5 is a schematic flowchart of a SIM card control method according to an embodiment of this application. As shown in FIG. 5, the method includes:

S501: A terminal device receives a first message, where the first message is used to indicate to select a second physical SIM card.

Specifically, a processor of the terminal device receives the first message.

For example, when the terminal device receives an operation of selecting the second physical SIM card by the user, the terminal device receives the first message.

S502: The terminal device controls a second level conversion apparatus to be enabled, and controls an ESIM chip to be disabled.

Specifically, the processor of the terminal device controls the second level conversion apparatus to be enabled, and controls the ESIM chip to be disabled (for example, be in a high impedance state).

For example, when the terminal device includes the circuit shown in FIG. 3, the processor controls the second level conversion apparatus 306 to be enabled and the ESIM chip 304 to be disabled (for example, be in a high impedance state, or be in a pull-down state with impedance).

In a possible implementation, the processor outputs a first enable signal of a first level and a second enable signal of a second level based on first information, where the first enable signal of the first level is used to control the second level conversion apparatus to be enabled, and the second enable signal of the second level is used to control the ESIM chip to be disabled (for example, be in the high impedance state, or be in a pull-down state with impedance).

The first level may be a low level, or may be a high level. The second level may be a high level, or may be a low level. A value of the first level and a value of the second level are not limited in this embodiment of this application.

For example, FIG. 6 is a schematic flowchart of a SIM card control method according to an embodiment of this application. As shown in FIG. 6, the method includes:

S601: A terminal dev ice receives a second message, where the second message is used to indicate to select an ESIM card.

Specifically, a processor of the terminal device receives the second message.

For example, when the terminal device receives an operation of selecting the ESIM card by the user, the terminal device receives the second message.

S602: The terminal device controls a second level conversion apparatus to be disabled, and controls the ESIM chip to be enabled.

Specifically, the processor of the terminal device controls the second level conversion apparatus to be disabled (for example, be in a high impedance state, or be in a pull-down state with impedance), and controls the ESIM chip to be enabled.

For example, when the terminal device includes the circuit shown in FIG. 3, the processor controls the second level conversion apparatus 306 to be disabled (for example, be in the high impedance state) and the ESIM chip 304 to be enabled.

In a possible implementation, the processor outputs a first enable signal of a third level and a second enable signal of a fourth level based on first information, where the first enable signal of the third level is used to control the second level conversion apparatus to be disabled (for example, be in the high impedance state or a pull-down state with impedance), and the second enable signal of the fourth level is used to control the ESIM chip to be enabled.

The third level may be a high level, or may be a low level. The fourth level may be a low level, or may be a high level. A value of the third level and a value of the fourth level are not limited in this embodiment of this application.

Figure 7:
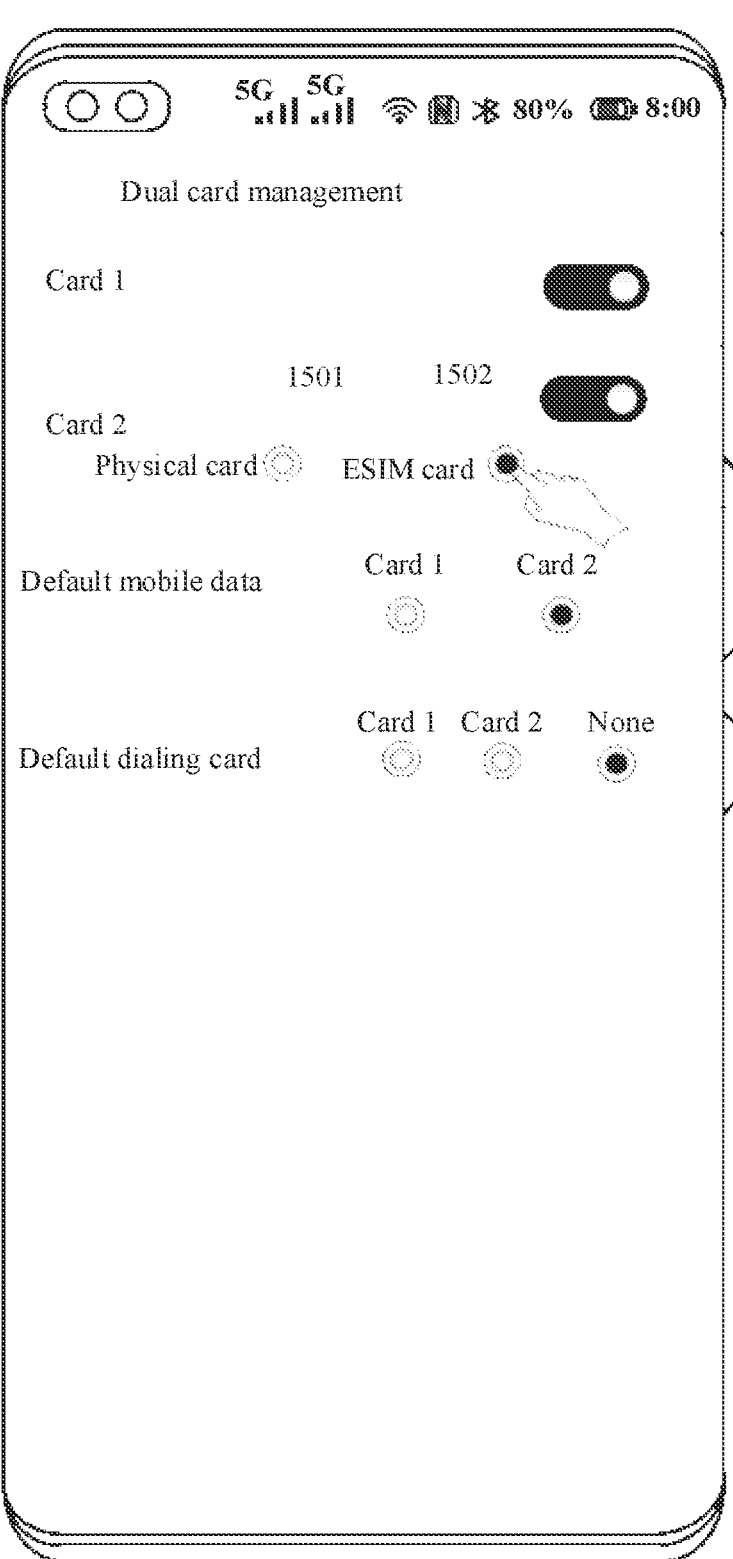
FIG. 7 is a schematic diagram of an interface of a terminal device according to an embodiment of this application.

For example, FIG. 7 is a schematic diagram of an interface of a terminal device according to an embodiment of this application.

As shown in FIG. 7, the interface includes a plurality of setting options. The setting options include but are not limited to a setting option of a SIM interface, a setting option of a default mobile data, a setting option of a default dialing card, or a setting option in another type. The setting option of the SIM interface includes a setting option of a card 1 and a setting option of a card 2. The setting option of the card 2 includes a physical card control 1501 and an ESIM card control 1502.

In this embodiment of this application, when the terminal device receives an operation of tapping the physical card control 1501 by a user, the terminal device receives a first message, and controls a second level conversion apparatus to be enabled and an ESIM chip to be disabled (for example, be in a high impedance state, or be in a pull-down state with impedance). When the terminal device receives an operation of tapping the ESIM card control 1502 by the user, the terminal device receives a second message, and controls the second level conversion apparatus to be disabled (for example, be in a high impedance state, or be in a pull-down state with impedance) and the ESIM chip to be enabled.

It should be noted that the interface shown in FIG. 7 is merely an example, and the interface may further include more or less content. This is not limited in this embodiment of this application. In addition, a form, a name, and the like of the control on the interface are not limited in this embodiment of this application.

The foregoing describes the touch panel failure communication method in this embodiment of this application. The following describes an apparatus provided in an embodiment of this application for performing the touch panel failure communication method. A person skilled in the art may understand that the method and the apparatus may be mutually combined and referenced. The related apparatus provided in this embodiment of this application may perform the steps in the touch panel failure communication method.

The SIM card control method provided in this embodiment of this application may be applied to an electronic device having a communication function. The electronic device includes the terminal device. For a specific device form and the like of the terminal device, refer to the foregoing related description. Details are not described herein again.

An embodiment of this application provides a terminal device, and the terminal device includes a processor and a memory. The memory stores computer executable instructions. The processor executes the computer execution instructions stored in the memory, so that the terminal device performs the foregoing method.

An embodiment of this application provides a chip. The chip includes a processor, and the processor is configured to invoke a computer program in a memory to execute the technical solutions in the foregoing embodiments. The implementation is similar to the foregoing related embodiments in terms of implementation principles and technical effects. Details are not repeated herein again.

An embodiment of this application further provides a computer-readable storage medium. The computer-readable storage medium stores a computer program. The foregoing method is implemented when the computer program is executed by the processor. The method described in the foregoing embodiments may be completely or partially implemented by using software, hardware, firmware, or any combination thereof. If implemented in software, the functions may be stored in a computer-readable medium or transmitted on a computer-readable medium as one or more instructions or code. The computer-readable medium may include a computer storage medium and a communication medium, and may further include any medium that enables a computer program to be transmitted from one place to another place. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. In addition, any connection is appropriately referred to as a computer-readable medium. For example, if software is transmitted from a website, a server, or another remote source by using a coaxial cable, an optical fiber cable, a twisted pair, a digital subscriber line (digital subscriber line, DSL), or wireless technologies (such as infrared, radio, and microwave), the coaxial cable, the optical fiber cable, the twisted pair, the DSL, or the wireless technologies such as infrared, radio, and microwave are included in the definition of the medium. As used herein, a magnetic disk and an optical disk include a compact disc, a laser disc, an optical disc, a digital versatile disc (digital versatile disc. DVD), a floppy disk, and a Blu-ray disc. The magnetic disk usually reproduces data in a magnetic manner, and the optical disk reproduces data optically by using a laser. A combination of the foregoing should also be included in the scope of the computer-readable medium.

An embodiment of this application provides a computer program product. The computer program product includes a computer program, and when the computer program is run, a computer is enabled to perform the foregoing method.

The embodiments of this application are described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a special-purpose computer, an embedded processor, or a processing unit of another programmable device to generate a machine, so that the instructions executed by the computer or the processing unit of the another programmable data processing device generate an apparatus for implementing a specific function in one or more procedures in the flowcharts and/or in one or more blocks in the block diagrams.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A circuit, comprising:
a processor;
a first card slot;
an embedded subscriber identification module (ESIM) chip comprising an input port connected to a group of subscriber identification module (SIM) interfaces of the processor; and
a first level conversion apparatus, comprising:
an input port connected to a same group of SIM interfaces of the processor as the ESIM chip input port; and
an output port connected to the first card slot,
wherein the processor is configured to:
control the first level conversion apparatus to be enabled and control the ESIM chip to be disabled based on receiving a first message, to implement a connection between the processor and a first physical SIM card in the first card slot; and
control the first level conversion apparatus to be disabled and control the ESIM chip to be enabled based on receiving a second message, to implement a connection between the processor and an ESIM card in the ESIM chip.

2. The circuit of claim 1, wherein the processor is configured to:
control the first level conversion apparatus to be enabled and control the ESIM chip to be in a high impedance state based on receiving the first message, to implement a connection between the processor and the first physical SIM card in the first card slot; and
control the first level conversion apparatus to be in a high impedance state and control the ESIM chip to be enabled based on receiving the second message, to implement a connection between the processor and the ESIM card in the ESIM chip.

3. The circuit of claim 2, wherein the first level conversion apparatus further comprises a port configured to receive a first enable signal, and the ESIM chip further comprises a port configured to receive a second enable signal, and wherein the processor is configured to:
separately output the first enable signal at a first level and the second enable signal at a second level based on receiving the first message, wherein the first enable signal at the first level is configured to control the first level conversion apparatus to be enabled, and the second enable signal at the second level is configured to control the ESIM chip to be in the high impedance state; and
separately output the first enable signal at a third level and the second enable signal at a fourth level based on receiving the second message, wherein the first enable signal at the third level is configured to control the first level conversion apparatus to be in the high impedance state, and the second enable signal at the fourth level is configured to control the ESIM chip to be enabled.

4. The circuit of claim 3, wherein the first level is different from the second level, and the third level is different from the fourth level.

5. The circuit of claim 3, wherein the first level is the same as the second level, and the third level is the same as the fourth level.

6. The circuit of claim 3, wherein the first enable signal and the second enable signal are provided by a same port of the processor, or the first enable signal and the second enable signal are provided by different ports of the processor.

7. The circuit of claim 1, wherein the processor comprises:
a first port configured to transmit a data signal (DATA);
a second port configured to transmit a reset signal (RST); and
a third port configured to transmit a clock signal (CLK),
wherein the first level conversion apparatus comprises a fourth port, a fifth port, a sixth port, a seventh port, an eighth port, and a ninth port,
wherein the first card slot comprises a tenth port, an eleventh port, and a twelfth port,
wherein the ESIM chip comprises a thirteenth port, a fourteenth port, and a fifteenth port,
wherein the first port, the second port, and the third port are respectively connected to the fourth port, the fifth port, and the sixth port,
wherein the first port, the second port, and the third port are further respectively connected to the thirteenth port, the fourteenth port, and the fifteenth port, and
wherein the seventh port, the eighth port, and the ninth port are respectively connected to the tenth port, the eleventh port, and the twelfth port.

8. The circuit of claim 1, further comprising a second card slot connected to the processor.

9. The circuit of claim 8, wherein the second card slot comprises a sixteenth port, a seventeenth port, and an eighteenth port, wherein the processor further comprises a nineteenth port configured to transmit a data signal (DATA), a twentieth port configured to transmit a reset signal (RST), and a twenty-first port configured to transmit a clock signal (CLK), and wherein the sixteenth port, the seventeenth port, and the eighteenth port are respectively connected to the nineteenth port, the twentieth port, and the twenty-first port, to implement a connection between the processor and a second physical SIM card in the second card slot.

10. The circuit of claim 8, further comprising a second level conversion apparatus located between the processor and the second card slot.

11. A method, comprising:

controlling, in response to receiving first information that indicates to select a first physical subscriber identification module (SIM) card, a first level conversion apparatus to be enabled and an embedded SIM (ESIM) chip to be disabled, wherein the first level conversion apparatus has an input port connected to a same group of SIM interfaces of a processor as an input port of the ESIM chip; and controlling, in response to receiving second information that indicates to select the ESIM card, the first level conversion apparatus to be disabled and the ESIM chip to be enabled.

12. The method of claim 11, wherein controlling the first level conversion apparatus to be enabled and the ESIM chip to be disabled comprises providing a first enable signal at a first level and a second enable signal at a second level based on the first information, wherein the first enable signal at the first level is configured to control the first level conversion apparatus to be enabled, and the second enable signal at the second level is configured to control the ESIM chip to be in a high impedance state, and wherein controlling the first level conversion apparatus to be disabled and the ESIM chip to be enabled comprises providing the first enable signal at a third level and the second enable signal at a fourth level based on the second information, wherein the first enable signal at the third level is configured to control the first level conversion apparatus to be in a high impedance state, and the second enable signal at the fourth level is configured to control the ESIM chip to be enabled.

13. The method of claim 12, wherein the first level is different from the second level, and the third level is different from the fourth level.

14. The method of claim 12, wherein the first level is the same as the second level, and the third level is the same as the fourth level.

15. The method of claim 12, wherein the first enable signal and the second enable signal are provided by a same port of the processor.

16. The method of claim 12, wherein the first enable signal and the second enable signal are provided by different ports of the processor.

17. A method, comprising:

displaying a first interface comprising a first control and a second control;

controlling, in response to receiving a first operation for the first control, a first level conversion apparatus to be enabled and an embedded subscriber identification module (ESIM) chip to be disabled, wherein the first level conversion apparatus has an input port connected to a same group of subscriber identification module (SIM) interfaces of a processor as an input port of the ESIM chip; and controlling, in response to receiving a second operation for the second control, the first level conversion apparatus to be disabled and the ESIM chip to be enabled.

18. The method of claim 17, wherein controlling the first level conversion apparatus to be enabled and the ESIM chip to be disabled comprises providing a first enable signal at a first level and a second enable signal at a second level based on the first operation, wherein the first enable signal at the first level is configured to control the first level conversion apparatus to be enabled, and the second enable signal at the second level is configured to control the ESIM chip to be in a high impedance state, and wherein controlling the first level conversion apparatus to be disabled and the ESIM chip to be enabled comprises providing the first enable signal at a third level and the second enable signal at a fourth level based on the second operation, wherein the first enable signal at the third level is configured to control the first level conversion apparatus to be in a high impedance state, and the second enable signal at the fourth level is configured to control the ESIM chip to be enabled.

19. The method of claim 18, wherein the first level is different from the second level, and the third level is different from the fourth level.

20. The method of claim 18, wherein the first level is the same as the second level, and the third level is the same as the fourth level.

* * * * *